United States Patent
Kimura et al.

(10) Patent No.: US 9,555,985 B2
(45) Date of Patent: Jan. 31, 2017

(54) SHEET CONVEYANCE DEVICE, IMAGE PROCESSING APPARATUS, SHEET CONVEYANCE METHOD

(71) Applicant: KYOCERA Document Solutions Inc., Osaka-shi, Osaka (JP)

(72) Inventors: Shinichi Kimura, Osaka (JP); Yasuyuki Yabuuchi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/855,226

(22) Filed: Sep. 15, 2015

(65) Prior Publication Data

US 2016/0083209 A1    Mar. 24, 2016

(30) Foreign Application Priority Data

Sep. 18, 2014 (JP) .................................. 2014-190072

(51) Int. Cl.
*B65H 1/04* (2006.01)
*B65H 7/10* (2006.01)
(Continued)

(52) U.S. Cl.
CPC *B65H 1/04* (2013.01); *B65H 7/10* (2013.01); *B65H 7/20* (2013.01); *B65H 9/101* (2013.01); *H04N 1/0066* (2013.01); *H04N 1/0071* (2013.01); *H04N 1/0079* (2013.01); *H04N 1/00615* (2013.01); *H04N 1/00663* (2013.01);
(Continued)

(58) Field of Classification Search
CPC ............... B65H 1/04; B65H 2405/1142; B65H 2405/11425; B65H 2405/1144; B65H 2405/1116; B65H 2557/64; B65H 2701/113; B65H 2701/1131; B65H 2553/81; B65H 2511/10; B65H 2511/16; B65H 2511/12; G03G 15/607

See application file for complete search history.

(56) References Cited

U.S. PATENT DOCUMENTS 4,874,160 A * 10/1989 Yamamoto ............... B65H 1/04
                                                            271/171
4,908,673 A *  3/1990 Muramatsu .......... G03G 15/234
                                                            271/171
(Continued)

FOREIGN PATENT DOCUMENTS

JP         H06183575 A    7/1994
JP         1996067410 A   3/1996

*Primary Examiner* — Ernesto Suarez
(74) *Attorney, Agent, or Firm* — Alleman Hall McCoy Russell & Tuttle LLP (57) ABSTRACT

A sheet conveyance device includes a sheet placing portion, a guide member, a signal obtaining portion, and a notification portion. On the sheet placing portion, a sheet to be conveyed is placed. The guide member is disposed on the sheet placing portion so as to move in a width direction vertical to a sheet conveyance direction, and restricts, in the width direction, a position of the sheet on the sheet placing portion. The signal obtaining portion obtains an electric signal with a value corresponding to a position of the guide member. The notification portion, when a difference between the value and any of thresholds that are set in advance based on each sheet size in the width direction for determination of the size of the sheet, is equal to or smaller than a predetermined reference value, notifies that the sheet is separated from the guide member.

8 Claims, 4 Drawing Sheets

(51) Int. Cl.
 *B65H 9/10* (2006.01)
 *B65H 7/20* (2006.01)
 *H04N 1/00* (2006.01)

(52) U.S. Cl.
 CPC ...... *H04N 1/00681* (2013.01); *H04N 1/00771* (2013.01); *B65H 2405/11425* (2013.01); *B65H 2511/12* (2013.01); *B65H 2553/81* (2013.01); *B65H 2557/64* (2013.01); *B65H 2801/39* (2013.01)

(56) References Cited

U.S. PATENT DOCUMENTS

| | | | | |
|---|---|---|---|---|
| 6,213,659 | B1* | 4/2001 | Elgee | B41J 11/003 271/171 |
| 7,635,129 | B2* | 12/2009 | Inoue | B65H 1/04 271/171 |
| 8,256,976 | B2* | 9/2012 | Edwards | B41J 11/003 400/642 |
| 8,550,459 | B2* | 10/2013 | Sekiguchi | B65H 7/02 271/152 |
| 8,746,672 | B2* | 6/2014 | Yoshida | B65H 1/00 271/171 |
| 2006/0255531 | A1* | 11/2006 | Azzopardi | B65H 1/04 271/171 |
| 2009/0066011 | A1* | 3/2009 | Ohno | B65H 1/266 271/171 |

* cited by examiner

SHEET CONVEYANCE DEVICE, IMAGE PROCESSING APPARATUS, SHEET CONVEYANCE METHOD

INCORPORATION BY REFERENCE

This application is based upon and claims the benefit of priority from the corresponding Japanese Patent Application No. 2014-190072 filed on Sep. 18, 2014, the entire contents of which are incorporated herein by reference.

BACKGROUND

The present disclosure relates to a sheet conveyance device, an image processing apparatus, and a sheet conveyance method.

In an image processing apparatus such as a scanner, the size of a document sheet may be determined before an image is read from the document sheet. For example, there is known an image processing apparatus that, in a configuration where a sheet conveyance device such as an auto document feeder (ADF) conveys a sheet placed on a sheet placing portion to a reading position, can determine the size of the document sheet placed on the sheet placing portion. The sheet placing portion provided in this type of image processing apparatus may include a guide member that is provided so as to be movable in the width direction that is perpendicular to the document sheet conveyance direction and can restrict the position, in the width direction, of the document sheet placed on the sheet placing portion. In addition, it is possible to determine the size of the document sheet placed on the sheet placing portion by obtaining an electric signal with a value that corresponds to the position of the guide member.

SUMMARY

A sheet conveyance device according to an aspect of the present disclosure includes a sheet placing portion, a guide member, a signal obtaining portion, and a notification portion. On the sheet placing portion, a sheet to be conveyed is placed. The guide member is disposed on the sheet placing portion so as to move in a width direction that is vertical to a sheet conveyance direction, and is configured to restrict, in the width direction, a position of the sheet placed on the sheet placing portion. The signal obtaining portion is configured to obtain an electric signal with a value that corresponds to a position of the guide member on the sheet placing portion. The notification portion is configured to, when a difference between the value of the electric signal obtained by the signal obtaining portion and any of one or more thresholds is equal to or smaller than a predetermined reference value, notify that the sheet placed on the sheet placing portion is separated from the guide member, the one or more thresholds being set in advance based on a length in the width direction for each size of the sheet for determination of a size of the sheet.

An image processing apparatus according to another aspect of the present disclosure includes the sheet conveyance device and an image reading portion. The image reading portion is configured to read image data from the sheet conveyed by the sheet conveyance device.

A sheet conveyance method according to a still another aspect of the present disclosure is executed by a sheet conveyance device that includes a sheet placing portion on which a sheet to be conveyed is placed, and a guide member disposed on the sheet placing portion so as to move in a width direction that is vertical to a sheet conveyance direction, and configured to restrict, in the width direction, a position of the sheet placed on the sheet placing portion, and includes a first step and a second step. In the first step, an electric signal with a value that corresponds to a position of the guide member on the sheet placing portion is obtained. In the second step, when a difference between the value of the electric signal obtained in the first step and any of one or more thresholds is equal to or smaller than a predetermined reference value, it is notified that the sheet placed on the sheet placing portion is separated from the guide member, the one or more thresholds being set in advance based on a length in the width direction for each size of the sheet for determination of a size of the sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the disclosure. It should be noted that the following description is an example of a specific embodiment of the present disclosure and should not limit the technical scope of the disclosure.

[Outlined Configuration of Image Processing Apparatus 10]

Figure 1:
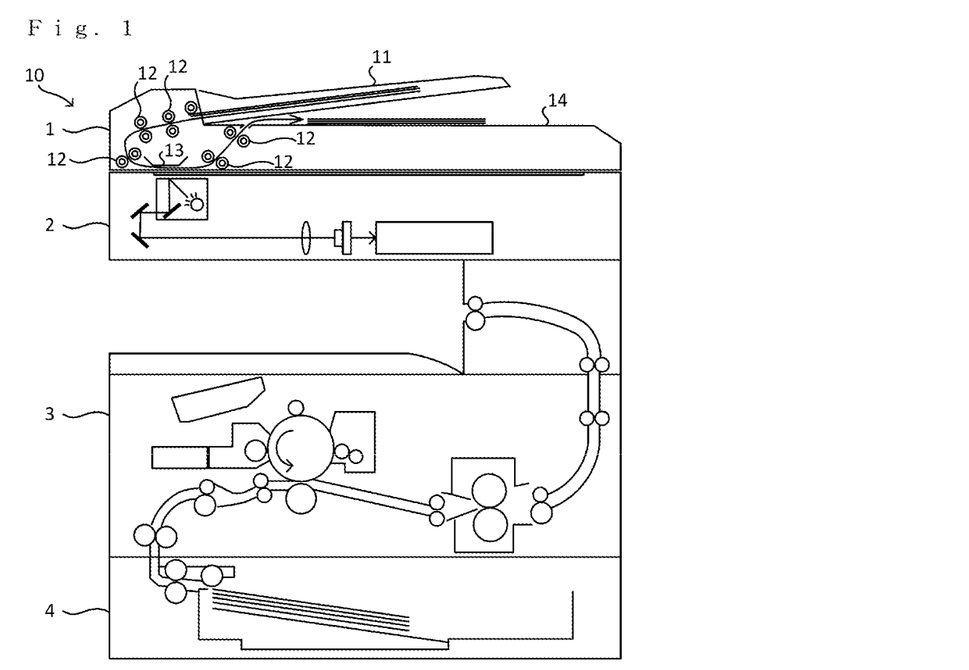
FIG. 1 is a diagram showing a configuration of an image processing apparatus according to an embodiment of the present disclosure.
Figure 3:
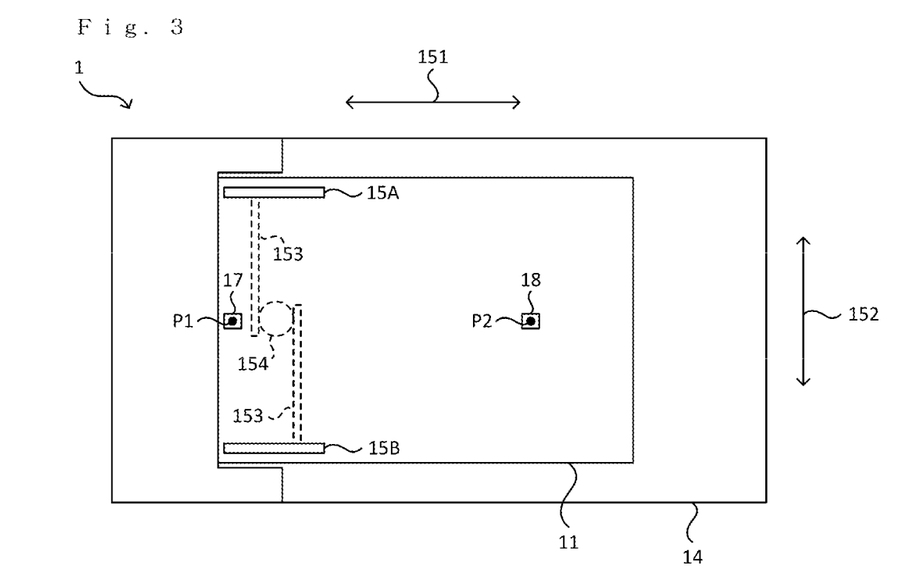
FIG. 3 is a diagram showing a configuration of an ADF included in the image processing apparatus according to an embodiment of the present disclosure.
Figure 4:
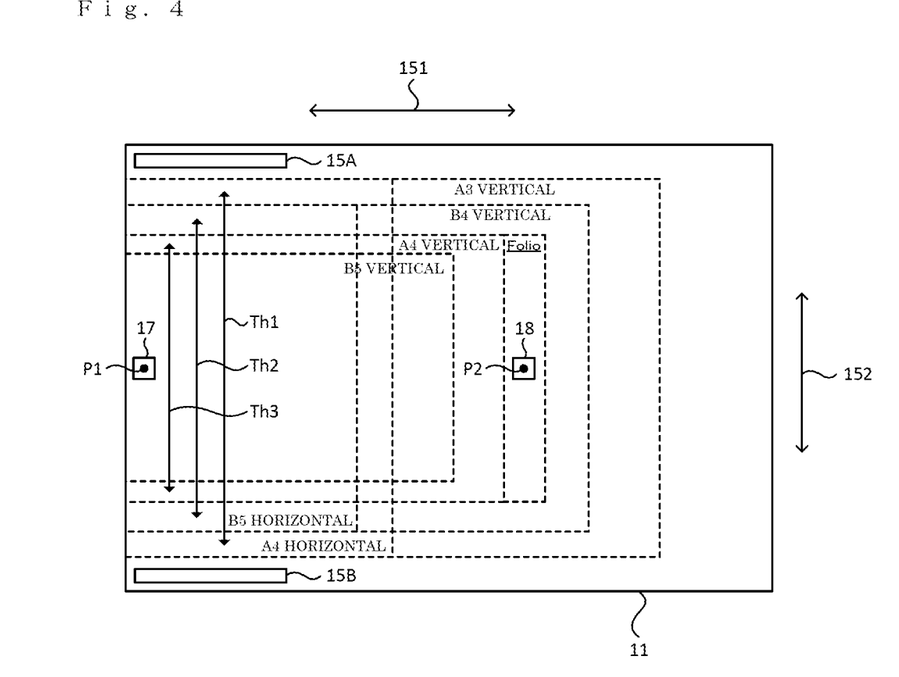
FIG. 4 is a diagram showing a configuration of the ADF included in the image processing apparatus according to an embodiment of the present disclosure.

First, an outlined configuration of an image processing apparatus 10 according to an embodiment of the present disclosure is described with reference to FIG. 1-FIG. 4. Here, FIG. 1 is a schematic cross-sectional view showing the configuration of the image processing apparatus 10. In addition, FIG. 3 is a schematic plan view showing the configuration of an ADF 1. Furthermore, FIG. 4 is a diagram showing the sizes of the document sheet to be placed on a document sheet placing portion 11 of the ADF 1.

Figure 2:
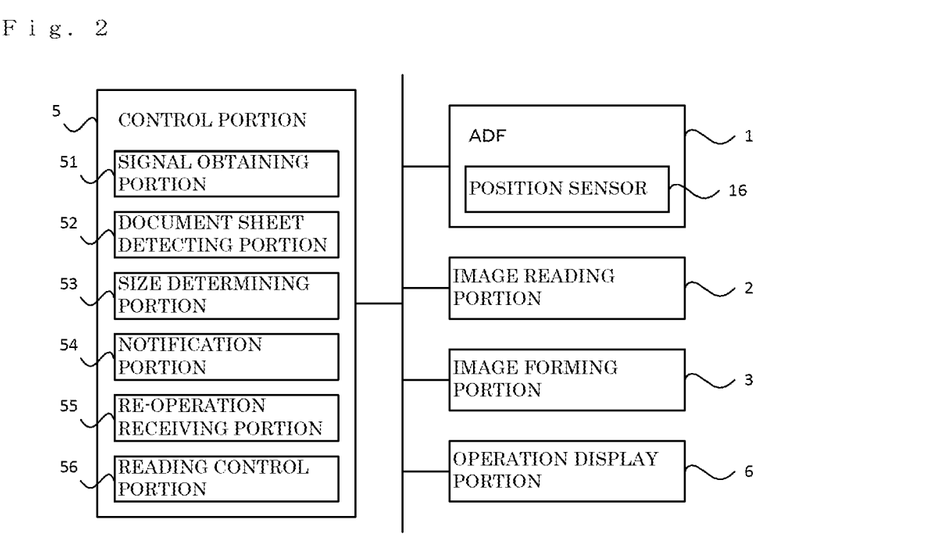
FIG. 2 is a block diagram showing a system configuration of the image processing apparatus according to an embodiment of the present disclosure.

As shown in FIG. 1 and FIG. 2, the image processing apparatus 10 includes an ADF 1, an image reading portion 2, an image forming portion 3, a sheet feed portion 4, a control portion 5, and an operation display portion 6. The image processing apparatus 10 is a multifunction peripheral having a plurality of functions such as a print function, a facsimile function, and a copy function, as well as a scan function to read image data from the document sheet. It is noted that in the image processing apparatus 10, a configuration including the ADF 1 and the control portion 5 is an example of the sheet conveyance device of the present disclosure. In addition, the present disclosure is applicable to an image processing apparatus such as a scanner apparatus, a printer apparatus, a facsimile apparatus, and a copier.

The image reading portion 2 includes a document sheet table, a reading unit, a plurality of mirrors, an optical lens, and a CCD (Charge Coupled Device), and can read image data from a document sheet.

The image forming portion 3 is configured to form an image by the electrophotography based on image data which has been read by the image reading portion 2, or based on image data input from an external information processing apparatus such as a personal computer. Specifically, the image forming portion 3 includes a photoconductor drum, a charging device, an optical scanning device (LSU), a developing device, a transfer roller, a cleaning device, a fixing roller, a pressure roller, and a sheet discharge tray. In the image forming portion 3, an image is formed on a sheet that is supplied from the sheet feed portion 4, and the sheet with the image formed thereon is discharged onto the sheet discharge tray. It is noted that the sheet is a sheet-like material such as a sheet of paper, a sheet of coated paper, a postcard, an envelope, or an OHP sheet.

The control portion 5 includes control equipment such as CPU, ROM, RAM, and EEPROM (registered trademark) that are not shown. The CPU is a processor for executing various types of arithmetic processes. The ROM is a nonvolatile storage portion in which various types of information such as control programs for causing the CPU to execute various types of processes are stored in advance. The RAM is a volatile storage portion, and the EEPROM is a nonvolatile storage portion. The RAM and the EEPROM are used as temporary storage memories (working areas) for the various types of processes executed by the CPU. The control portion 5 comprehensively controls the image processing apparatus 10 by executing the various types of control programs stored in advance in the ROM, by using the CPU. It is noted that the control portion 5 may be formed as an electronic circuit such as an integrated circuit (ASIC), and may be a control portion provided independently of a main control portion that comprehensively controls the image processing apparatus 10.

The operation display portion 6 includes a display portion and an operation portion. The display portion is, for example, a liquid crystal display and displays various types of information based on control instructions from the control portion 5. The operation portion is composed of, for example, operation keys or a touch panel through which various types of information are input to the control portion 5 based on user operations.

As shown in FIG. 1, the ADF 1 is an automatic document sheet feeding device and includes a document sheet placing portion 11, a plurality of conveying rollers 12, a document sheet pressing 13, and a sheet discharge portion 14. In the ADF 1, the plurality of conveying rollers 12 are driven by a motor (not shown) such that the document sheet placed on the document sheet placing portion 11 is conveyed to pass through an image data reading position where the image data is read by the image reading portion 2, and then conveyed to the sheet discharge portion 14. With this configuration, the image reading portion 2 can read image data from the document sheet conveyed by the ADF 1. Here, the document sheet placing portion 11 is an example of the sheet placing portion of the present disclosure. In addition, the document sheet conveyed by the ADF 1 is an example of the sheet of the present disclosure.

Here, in the image processing apparatus 10, the size of the document sheet placed on the document sheet placing portion 11 of the ADF 1 is determined. Specifically, as shown in FIG. 2-FIG. 4, the document sheet placing portion 11 of the ADF 1 includes guide members 15A and 15B, a position sensor 16, a first sensor 17, and a second sensor 18.

The guide members 15A and 15B are disposed on the document sheet placing portion 11 so as to movable in a width direction 152 that is vertical to a document sheet conveyance direction 151, and restrict, in the width direction 152, the position of the document sheet placed on the document sheet placing portion 11.

For example, as shown in FIG. 3, the guide members 15A and 15B are configured to move interlocking with each other to approach and separate each other in the width direction 152 by being connected to a rack 153 and a pinion 154 provided inside the document sheet placing portion 11. This allows the user to restrict, in the width direction 152, the position of the document sheet by operating the guide members 15A and 15B when placing the document sheet at a placement reference position P1 (see FIG. 3) on the document sheet placing portion 11. It is noted that, in the document sheet placing portion 11, only one of the guide members 15A and 15B may be configured to move in the width direction 152, and the other may be fixed.

The position sensor 16 outputs an electric signal with a value that corresponds to the position of the guide members 15A and 15B on the document sheet placing portion 11, namely, an electric signal with a value that corresponds to the separation distance between the guide members 15A and 15B. The position sensor 16 is, for example, an electric circuit including a variable resistor that changes its resistance value based on the movement of the rack 153 in the width direction 152 or the rotation of the pinion 154. The position sensor 16 outputs, to the control portion 5, an electric signal having a voltage or a current that corresponds to the resistance value of the variable resistor, in response to a control signal input from the control portion 5. This allows the control portion 5 to detect the separation distance between the guide members 15A and 15B in the width direction 152 based on the electric signal output from the position sensor 16.

The first sensor 17 outputs an electric signal with a value that corresponds to the presence/absence of a document sheet at the placement reference position P1. As shown in FIG. 3 and FIG. 4, the first sensor 17 is, for example, a reflection-type optical sensor that is disposed on the placement reference position P1 and includes a light emitter and a light receptor. The first sensor 17 outputs, to the control portion 5, an electric signal with a value that corresponds to the presence/absence of a document sheet at the placement reference position P1, in response to the control signal input from the control portion 5. This allows the control portion 5 to detect the presence/absence of a document sheet on the document sheet placing portion 11 based on the electric signal output from the first sensor 17.

The second sensor 18 outputs an electric signal with a value that corresponds to the presence/absence of a document sheet at a predetermined determination position P2 on the document sheet placing portion 11. Specifically, as shown in FIG. 4, the determination position P2 in the image processing apparatus 10 is a position that is within the region of a document sheet of a Folio size placed at the placement reference position P1 on the document sheet placing portion 11, but is outside the region of a document sheet of an A4 vertical size similarly placed on the document sheet placing portion 11. As shown in FIG. 3 and FIG. 4, the second sensor 18 is, for example, a reflection-type optical sensor that is disposed on the determination position P2 and includes a light emitter and a light receptor. The second sensor 18 outputs an electric signal with a value that corresponds to the presence/absence of a document sheet at the determination position P2, in response to the control signal input from the control portion 5. This allows the control portion 5 to detect the presence/absence of a document sheet at the determination position P2 on the document sheet placing portion 11 based on the electric signal output from the second sensor 18.

On the other hand, a storage portion such as the EEPROM of the control portion 5 stores a plurality of thresholds Th1-Th3 that are set in advance based on the length in the width direction 152 for each size of the document sheet for determination of the size of the document sheet. Specifically, as shown in FIG. 4, the plurality of thresholds Th1-Th3 are set based on the length in the width direction 152 for each of the A3 vertical size, the B4 vertical size, the A4 vertical size, and the B5 vertical size of the document sheet placed on the document sheet placing portion 11. It is noted that the number of thresholds that are set in advance for determination of the size of the document sheet may be 1 (one), 2 (two), or 4 (four) or higher.

More specifically, threshold Th1 is set to be in the range between the length (297 mm) of the document sheet of the A3 vertical size in the width direction 152 and the length (257 mm) of the document sheet of the B4 vertical size in the width direction 152. For example, threshold Th1 may be set to an intermediate value (277 mm) between the length of the document sheet of the A3 vertical size in the width direction 152 and the length of the document sheet of the B4 vertical size in the width direction 152.

In addition, threshold Th2 is set to be in the range between the length (257 mm) of the document sheet of the B4 vertical size in the width direction 152 and the length (210 mm) of the document sheet of the A4 vertical size in the width direction 152. For example, threshold Th2 may be set to an intermediate value (233.5 mm) between the length of the document sheet of the B4 vertical size in the width direction 152 and the length of the document sheet of the A4 vertical size in the width direction 152.

Furthermore, threshold Th3 is set to be in the range between the length (210 mm) of the document sheet of the A4 vertical size in the width direction 152 and the length (182 mm) of the document sheet of the B5 vertical size in the width direction 152. For example, threshold Th3 may be set to an intermediate value (196 mm) between the length of the document sheet of the A4 vertical size in the width direction 152 and the length of the document sheet of the B5 vertical size in the width direction 152.

The control portion 5 detects a separation distance between the guide members 15A and 15B based on the electric signal output from the position sensor 16, and determines the size of the document sheet placed on the document sheet placing portion 11 based on the result of comparison between the detected separation distance and the plurality of thresholds Th1-Th3 and the electric signal output from the second sensor 18.

Specifically, when the separation distance exceeds the threshold Th1, the control portion 5 determines the size of the document sheet as A3 vertical or A4 horizontal. Furthermore, in this case, upon detecting the presence of the document sheet at the determination position P2 based on the electric signal output from the second sensor 18, the control portion 5 determines the size of the document sheet as A3 vertical. On the other hand, upon detecting the absence of the document sheet at the determination position P2, the control portion 5 determines the size of the document sheet as A4 horizontal.

In addition, when the separation distance exceeds the threshold Th2 and is equal to or smaller than the threshold Th1, the control portion 5 determines the size of the document sheet as B4 vertical or B5 horizontal. Furthermore, in this case, upon detecting the presence of the document sheet at the determination position P2 based on the electric signal output from the second sensor 18, the control portion 5 determines the size of the document sheet as B4 vertical. On the other hand, upon detecting the absence of the document sheet at the determination position P2, the control portion 5 determines the size of the document sheet as B5 horizontals.

In addition, when the separation distance exceeds the threshold Th3 and is equal to or smaller than the threshold Th2, the control portion 5 determines the size of the document sheet as Folio or A4 vertical. Furthermore, in this case, upon detecting the presence of the document sheet at the determination position P2 based on the electric signal output from the second sensor 18, the control portion 5 determines the size of the document sheet as Folio. On the other hand, upon detecting the absence of the document sheet at the determination position P2, the control portion 5 determines the size of the document sheet as A4 vertical.

In addition, when the separation distance is equal to or smaller than the threshold Th3, the control portion 5 determines the size of the document sheet as B5 vertical.

Meanwhile, when the user neglects to operate the guide members 15A and 15B, and the document sheet placed on the document sheet placing portion 11 is separated from the guide members 15A and 15B, the document sheet may be conveyed and read in an inclined state. In addition, when the document sheet placed on the document sheet placing portion 11 is separated from the guide members 15A and 15B, a size that is different from a size intended by the user may be determined and an image may be read from the document sheet. On the other hand, in the image processing apparatus 10, it is possible to restrict the document sheet from being conveyed in an inclined state, and to restrict the size of the document sheet from being determined to be different from the size intended by the user.

Specifically, a reading control program is stored in advance in the ROM or the EEPROM of the control portion 5, wherein the reading control program causes the CPU to execute a reading control process (see FIG. 5) or a movement monitoring process (see FIG. 6) that are described below. It is noted that the reading control program may be recorded in a computer-readable recording medium such as a CD, a DVD, or a flash memory, and may be installed to a storage portion such as the EEPROM of the control portion 5 by being read from the recording medium.

As shown in FIG. 2, the control portion 5 includes a signal obtaining portion 51, a document sheet detecting portion 52, a size determining portion 53, a notification portion 54, a re-operation receiving portion 55, and a reading control portion 56. Specifically, the control portion 5 functions as the signal obtaining portion 51, document sheet detecting portion 52, size determining portion 53, notification portion 54, re-operation receiving portion 55, and reading control portion 56 when it executes, by using the CPU, the reading control program stored in the ROM. Here, the reading control portion 56 is an example of the conveyance control portion of the present disclosure.

The signal obtaining portion 51 obtains an electric signal with a value that corresponds to the position of the guide members 15A and 15B on the document sheet placing portion 11. Specifically, the signal obtaining portion 51 transmits a control signal to the position sensor 16 to cause it to output the electric signal with a value that corresponds to the separation distance between the guide members 15A and 15B.

In addition, the signal obtaining portion 51 obtains the electric signal when an operation instructing an execution of an image reading process is performed on the operation display portion 6, wherein in the image reading process, image data is read from the document sheet conveyed by the ADF 1. Here, the image reading process includes a document sheet conveying process in which the document sheet placed on the document sheet placing portion 11 is conveyed. Here, the document sheet conveying process included in the image reading process is an example of the sheet conveying process of the present disclosure.

Furthermore, the signal obtaining portion 51 obtains the electric signal at predetermined intervals during an execution of the image reading process. For example, the length of each interval is set to be in a range from 0.01 seconds to 1 second.

The document sheet detecting portion 52 detects the presence or absence of a document sheet at the determination position P2 on the document sheet placing portion 11. Specifically, the document sheet detecting portion 52 transmits a control signal to the second sensor 18 to cause it to output an electric signal with a value that corresponds to the presence or absence of the document sheet at the determination position P2. The document sheet detecting portion 52 then detects the presence or absence of a document sheet at the determination position P2 based on the electric signal output from the second sensor 18.

The size determining portion 53 determines the size of the document sheet placed on the document sheet placing portion 11, based on the value of the electric signal obtained by the signal obtaining portion 51 and the detection result of the document sheet detecting portion 52. Specifically, the size determining portion 53 detects the separation distance between the guide members 15A and 15B based on the electric signal obtained by the signal obtaining portion 51, and determines the size of the document sheet placed on the document sheet placing portion 11, based on the result of a comparison between the detected separation distance and the thresholds Th1-Th3 and the detection result of the document sheet detecting portion 52. It is noted that the size determining portion 53 may determine the size of the document sheet placed on the document sheet placing portion 11, based on the value of the electric signal.

When a difference between the value of the electric signal obtained by the signal obtaining portion 51 and any of the plurality of thresholds Th1-Th3 is equal to or smaller than a predetermined reference value, the notification portion 54 notifies that the document sheet placed on the document sheet placing portion 11 is separated from the guide members 15A and 15B. Specifically, the notification portion 54 notifies, before the image reading process is executed, that the document sheet placed on the document sheet placing portion 11 is separated from the guide members 15A and 15B. For example, the notification portion 54 notifies it by displaying, on the operation display portion 6, a message indicating that the document sheet placed on the document sheet placing portion 11 is separated from the guide members 15A and 15B.

Here, the reference value is set to an appropriate value based on the thresholds Th1-Th3 and the length in the width direction 152 of each size of the document sheet so that the separation between the document sheet and the guide members 15A and 15B can be detected with a desired accuracy. For example, the reference value may be set to an appropriate value in a range from 1 mm to 5 mm. It is noted that the reference value may be set for each of the thresholds Th1-Th3.

In addition, the notification portion 54 notifies that the document sheet is separated from the guide members 15A and 15B, when a difference between the value of the electric signal obtained by the signal obtaining portion 51 during an execution of the image reading process and any of the plurality of thresholds Th1-Th3 has become equal to or smaller than the reference value.

The re-operation receiving portion 55 receives, after the notification by the notification portion 54, a re-operation instructing an execution of the image reading process. For example, after the notification by the notification portion 54, the re-operation receiving portion 55 displays a re-operation screen on the operation display portion 6 and receives, through the re-operation screen, a re-operation instructing an execution of the image reading process.

The reading control portion 56 executes the image reading process in response to an input of a predetermined operation. For example, the reading control portion 56 executes the image reading process when an operation instructing the execution of the image reading process is input on the operation display portion 6.

In addition, when the difference between the value of the electric signal obtained by the signal obtaining portion 51 and any of the plurality of thresholds Th1-Th3 is equal to or smaller than the reference value, the reading control portion 56 executes the image reading process after the re-operation receiving portion 55 receives the operation instructing an execution of the image reading process.

Furthermore, when the difference between the value of the electric signal obtained by the signal obtaining portion 51 and any of the plurality of thresholds Th1-Th3 has become equal to or smaller than the reference value during the execution of the image reading process, the reading control portion 56 stops the execution of the image reading process. It is noted that when the re-operation receiving portion 55 receives an operation instructing an execution of the image reading process, the reading control portion 56 resumes the execution of the stopped image reading process.

[Reading Control Process]

Figure 5:
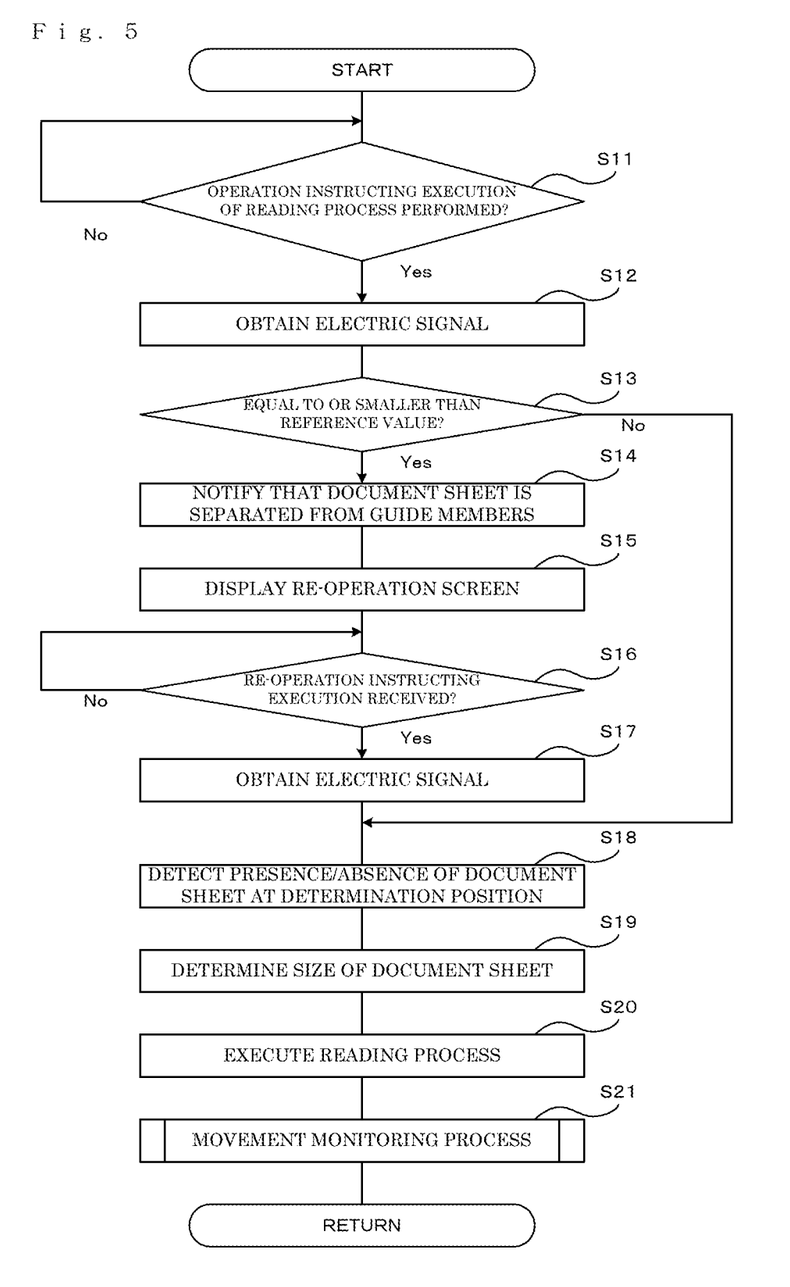
FIG. 5 is a flowchart showing an example of the reading control process executed by the image processing apparatus according to an embodiment of the present disclosure.

The following describes, with reference to FIG. 5, an example of the procedure of the reading control process that is executed by the control portion 5 based on the reading control program in the image processing apparatus 10. Here, steps S11, S12, . . . represent numbers of the processing procedures (steps) executed by the control portion 5.

<Step S11>

First, in step S11, the control portion 5 determines whether or not an operation instructing an execution of the image reading process has been performed on the operation display portion 6.

Here, upon determining that an operation instructing an execution of the image reading process has been performed (Yes side at S11), the control portion 5 moves the process to step S12. In addition, upon determining that an operation instructing an execution of the image reading process has not been performed (No side at S11), the control portion 5 waits, at step S11, for an operation instructing an execution of the image reading process to be performed.

<Step S12>

In step S12, the control portion 5 obtains an electric signal with a value that corresponds to the position of the guide members 15A and 15B on the document sheet placing portion 11. Specifically, the control portion 5 transmits a control signal to the position sensor 16 to cause it to output the electric signal. Here, the process of step S12 is an example of the first step of the present disclosure, and is executed by the signal obtaining portion 51 of the control portion 5.

<Step S13>

In step S13, the control portion 5 determines whether or not the difference between the value of the electric signal obtained in step S12 and any of the plurality of thresholds Th1-Th3 is equal to or smaller than the reference value.

Here, upon determining that the difference between the value of the electric signal obtained in step S12 and any of the plurality of thresholds Th1-Th3 is equal to or smaller than the reference value (Yes side at S13), the control portion 5 moves the process to step S14. In addition, upon determining that each difference between the value of the electric signal obtained in step S12 and each of the plurality of thresholds Th1-Th3 exceeds the reference value (No side at S13), the control portion 5 moves the process to step S18.

<Step S14>

In step S14, the control portion 5 notifies that the document sheet placed on the document sheet placing portion 11 is separated from the guide members 15A and 15B. Specifically, the control portion 5 notifies it by displaying, on the operation display portion 6, a message indicating that the document sheet placed on the document sheet placing portion 11 is separated from the guide members 15A and 15B. Here, the processes of step S13 and step S14 are an example of the second step of the present disclosure, and are executed by the notification portion 54 of the control portion 5. This enables the user to recognize that the document sheet placed on the document sheet placing portion 11 is separated from the guide members 15A and 15B and eliminate the separated state by operating the guide members 15A and 15B.

In addition, the notification of step S14 is performed before the execution of the image reading process in step S20 that is described below. As a result, the user can recognize that the document sheet is separated from the guide members 15A and 15B and eliminate the separated state before the execution of the image reading process.

<Step S15>

In step S15, the control portion 5 displays the re-operation screen on the operation display portion 6.

<Step S16>

In step S16, the control portion 5 determines whether or not a re-operation instructing an execution of the image reading process has been received on the re-operation screen displayed in step S15.

Here, upon determining that a re-operation instructing an execution of the image reading process has been received on the re-operation screen (Yes side at S16), the control portion 5 moves the process to step S17. In addition, upon determining that a re-operation instructing an execution of the image reading process has not been received on the re-operation screen (No side at S16), the control portion 5 waits, at step S16, for a re-operation instructing an execution of the image reading process to be performed. Here, the processes of step S15 and step S16 are executed by the re-operation receiving portion 55 of the control portion 5. This enables the user to operate the guide members 15A and 15B at a desired timing when executing the image reading process. It is noted that the control portion 5 may wait for a predetermined wait time to pass, instead of the processes of step S15 and step S16.

<Step S17>

In step S17, as in step S12, the control portion 5 obtains an electric signal with a value that corresponds to the position of the guide members 15A and 15B on the document sheet placing portion 11. Here, the process of step S17 is executed by the signal obtaining portion 51 of the control portion 5.

<Step S18>

In step S18, the control portion 5 detects the presence/absence of a document sheet at the determination position P2 on the document sheet placing portion 11. Specifically, the control portion 5 transmits a control signal to the second sensor 18 to cause it to output an electric signal with a value that corresponds to the presence/absence of a document sheet at the determination position P2. The control portion 5 then detects the presence/absence of a document sheet at the determination position P2, based on the electric signal output from the second sensor 18. Here, the process of step S18 is executed by the document sheet detecting portion 52 of the control portion 5.

<Step S19>

In step S19, the control portion 5 determines the size of the document sheet placed on the document sheet placing portion 11, based on the value of the electric signal obtained in step S17 and the detection result of step S18. Specifically, the control portion 5 detects the separation distance between the guide members 15A and 15B based on the electric signal obtained in step S17, and determines the size of the document sheet placed on the document sheet placing portion 11, based on the result of comparison between the detected separation distance and the thresholds Th1-Th3 and the detection result of step S18. Here, the process of step S19 is executed by the size determining portion 53 of the control portion 5.

It is noted that when it is determined in step S13 that each difference between the value of the electric signal obtained in step S12 and each of the plurality of thresholds Th1-Th3 exceeds the reference value (No side at S13), the control portion 5 determines the size of the document sheet placed on the document sheet placing portion 11, based on the value of the electric signal obtained in step S12 and the detection result of step S18.

<Step S20>

In step S20, the control portion 5 executes the image reading process. Here, the processes of step S11 and step S20 are executed by the reading control portion 56 of the control portion 5.

<Step S21>

In step S21, during the execution of the image reading process, the control portion 5 executes the movement monitoring process that is described in the following.

[Movement Monitoring Process]

Figure 6:
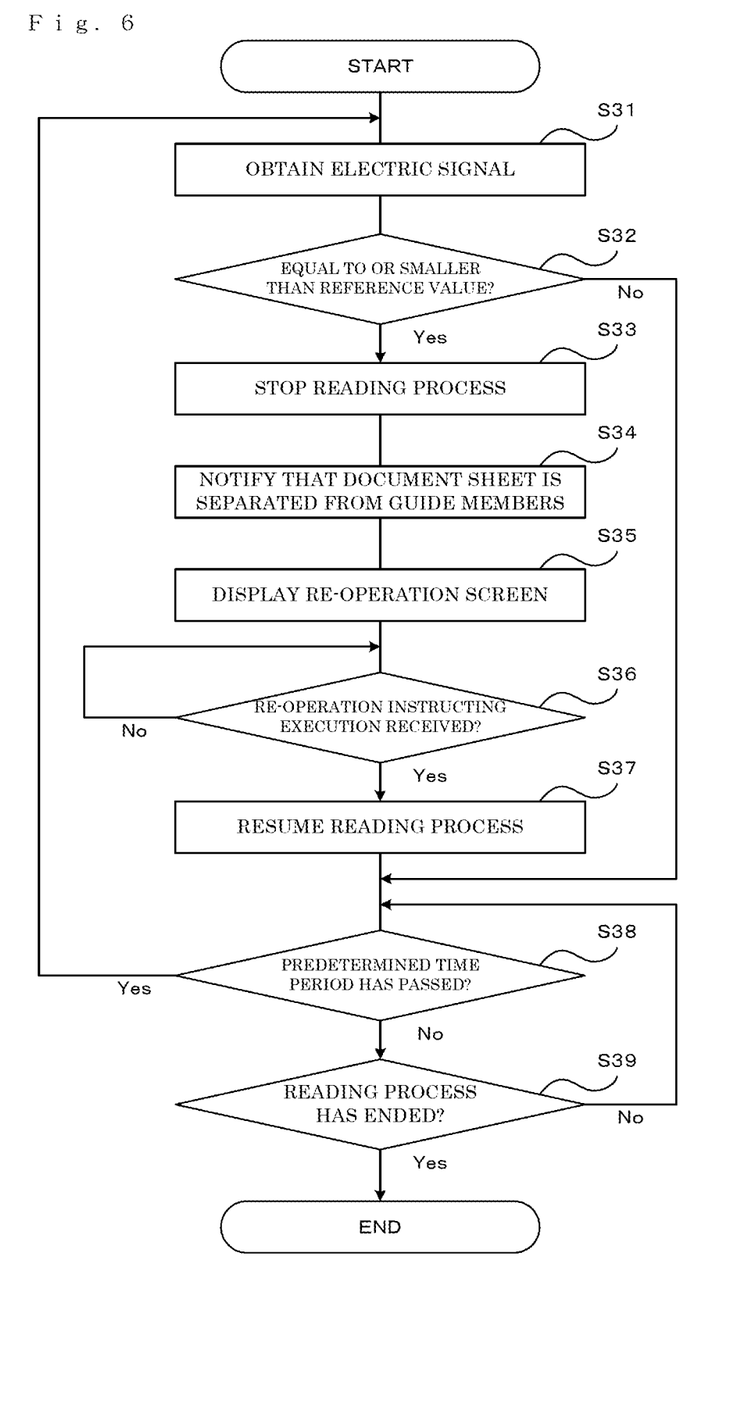
FIG. 6 is a flowchart showing an example of the movement monitoring process executed by the image processing apparatus according to an embodiment of the present disclosure.

Next, with reference to FIG. 6, a description is given of an example of the procedure of the movement monitoring process that is executed by the control portion 5 in step S21 of the reading control process.

<Step S31>

In step S31, as in step S12 of the reading control process, the control portion 5 obtains an electric signal with a value that corresponds to the position of the guide members 15A and 15B on the document sheet placing portion 11. Here, the process of step S31 is executed by the signal obtaining portion 51 of the control portion 5.

<Step S32>

In step S32, as in step S13 of the reading control process, the control portion 5 determines whether or not the difference between the value of the electric signal obtained in step S31 and any of the plurality of thresholds Th1-Th3 is equal to or smaller than the reference value.

Here, upon determining that the difference between the value of the electric signal obtained in step S31 and any of the plurality of thresholds Th1-Th3 is equal to or smaller than the reference value (Yes side at S32), the control portion 5 moves the process to step S33. In addition, upon determining that each difference between the value of the electric signal obtained in step S31 and each of the plurality of thresholds Th1-Th3 exceeds the reference value (No side at S32), the control portion 5 moves the process to step S38.

<Step S33>

In step S33, the control portion 5 stops the execution of the image reading process. Here, the processes of step S32 and step S33 are executed by the reading control portion 56 of the control portion 5. This makes it possible to avoid a situation where the document sheet is conveyed and read while the guide members 15A and 15B are separated from the document sheet due to, for example, an action of the user to add one or more document sheets on the document sheet placing portion 11.

<Step S34>

In step S34, as in step S14 of the reading control process, the control portion 5 notifies that the document sheet placed on the document sheet placing portion 11 is separated from the guide members 15A and 15B. Here, the process of step S34 is executed by the notification portion 54 of the control portion 5. This enables the user to recognize that the document sheet placed on the document sheet placing portion 11 is separated from the guide members 15A and 15B and eliminate the separated state in the case where the guide members 15A and 15B have been separated from the document sheet due to, for example, an action of the user to add one or more document sheets on the document sheet placing portion 11.

<Step S35>

In step S35, as in step S15 of the reading control process, the control portion 5 displays the re-operation screen on the operation display portion 6.

<Step S36>

In step S36, the control portion 5 determines whether or not a re-operation instructing an execution of the image reading process has been received on the re-operation screen displayed in step S35.

Here, upon determining that a re-operation instructing an execution of the image reading process has been received on the re-operation screen (Yes side at S36), the control portion 5 moves the process to step S37. In addition, upon determining that a re-operation instructing an execution of the image reading process has not been received on the re-operation screen (No side at S36), the control portion 5 waits, at step S36, for a re-operation instructing an execution of the image reading process to be performed. Here, the processes of step S35 and step S36 are executed by the re-operation receiving portion 55 of the control portion 5.

<Step S37>

In step S37, the control portion 5 resumes the execution of the image reading process that has been stopped in step S33. Here, the process of step S37 is executed by the reading control portion 56 of the control portion 5.

<Step S38>

In step S38, the control portion 5 determines whether or not a predetermined time period corresponding to the intervals has passed. Here, the process of step S38 is executed by the signal obtaining portion 51 of the control portion 5.

Here, upon determining that the predetermined time period corresponding to the intervals has passed (Yes side at S38), the control portion 5 moves the process to step S31. In addition, upon determining that the predetermined time period corresponding to the intervals has not passed (No side at S38), the control portion 5 moves the process to step S39.

<Step S39>

In step S39, the control portion 5 determines whether or not the image reading process has ended. For example, upon detecting the absence of a document sheet at the placement reference position P1 based on the electric signal output from the first sensor 17, the control portion 5 determines that the image reading process has ended.

Here, upon determining that the image reading process has ended (Yes side at S39), the control portion 5 ends the movement monitoring process. In addition, upon determining that the image reading process has not ended (No side at S39), the control portion 5 moves the process to step S38 and waits for the predetermined time period corresponding to the intervals to pass, or waits for the image reading process to end. This allows the movement of the guide members 15A and 15B to be monitored during an execution of the image reading process.

It is noted that the control portion 5 may execute a process for determining whether or not an amount of variation of the electric signal obtained at the intervals in step S31 exceeds a predetermined reference amount, instead of the process of step S32. In this case, upon determining that the amount of variation of the electric signal obtained at the intervals exceeds the predetermined reference amount, the control portion 5 executes the processes of step S33 to step S37.

As described above, in the reading control process, when the difference between the value of the electric signal obtained by the signal obtaining portion 51 and any of the thresholds Th1-Th3 that are used in determining the size of the document sheet is equal to or smaller than the reference value, it is notified that the document sheet is separated from the guide members 15A and 15B. This makes it possible to restrict the document sheet placed on the document sheet placing portion 11 from being conveyed in an inclined state, and to restrict the size of the document sheet from being determined to be different from the size intended by the user.

It is noted that the present disclosure may be applied to the sheet feed portion 4 that feeds a sheet to the image forming portion 3. For example, the present disclosure may be applied to the sheet feed portion 4 in a configuration where the sheet feed portion 4 of the image processing apparatus 10 includes a manual feed tray on which the sheet to be fed to the image forming portion 3 is placed. In this case, a device including the sheet feed portion 4 and the control portion 5 is another example of the sheet conveyance device of the present disclosure. In addition, the manual feed tray is another example of the sheet placing portion of the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveyance device comprising:
a sheet placing portion on which a sheet to be conveyed is placed;
a guide member disposed on the sheet placing portion so as to move in a width direction that is vertical to a sheet conveyance direction, and configured to restrict, in the width direction, a position of the sheet placed on the sheet placing portion;
a signal obtaining portion executed by a processor, configured to obtain an electric signal with a value that corresponds to a position of the guide member on the sheet placing portion; and
a notification portion operatively coupled to a display and executed by a processor, configured to, when a difference between the value of the electric signal obtained by the signal obtaining portion and any of one or more thresholds is equal to or smaller than a predetermined reference value, cause the display to display a notification that the sheet placed on the sheet placing portion is separated from the guide member, the one or more thresholds being set in advance based on a length in the width direction for each size of the sheet for determination of a size of the sheet, wherein
each of the one or more thresholds is set in advance to be in a range between lengths in the width direction of different sizes closest to each other.

2. The sheet conveyance device according to claim 1 further comprising
a conveyance control portion configured to execute, in response to an input of a predetermined operation, a sheet conveying process of conveying the sheet placed on the sheet placing portion, wherein
the signal obtaining portion obtains the electric signal when the predetermined operation is input, and
the notification portion, when the difference is equal to or smaller than the predetermined reference value, notifies that the sheet placed on the sheet placing portion is separated from the guide member, before the sheet conveying process is executed.

3. The sheet conveyance device according to claim 2 further comprising
a re-operation receiving portion configured to receive, after the notification portion performs a notification, a re-operation instructing an execution of the sheet conveying process, wherein
when the difference between the value of the electric signal obtained by the signal obtaining portion and any of the one or more thresholds is equal to or smaller than the reference value, the conveyance control portion executes the sheet conveying process after the re-operation receiving portion receives the re-operation instructing an execution of the sheet conveying process.

4. The sheet conveyance device according to claim 2, wherein
the signal obtaining portion obtains the electric signal at predetermined intervals during an execution of the sheet conveying process,
the notification portion, when the difference between the value of the electric signal obtained by the signal obtaining portion during the execution of the sheet conveying process and any of the one or more thresholds is equal to or smaller than the reference value, notifies that the sheet is separated from the guide member, and
the conveyance control portion, when the difference between the value of the electric signal obtained by the signal obtaining portion during the execution of the sheet conveying process and any of the one or more thresholds is equal to or smaller than the reference value, stops the execution of the sheet conveying process.

5. An image processing apparatus comprising:
the sheet conveyance device according to claim 1; and
an image reading portion configured to read image data from the sheet conveyed by the sheet conveyance device.

6. The image processing apparatus according to claim 5 further comprising
an image forming portion configured to form an image based on the image data read by the image reading portion.

7. The sheet conveyance device according to claim 1, wherein
each of the one or more thresholds is an intermediate value between lengths in the width direction of different sizes closest to each other.

8. A sheet conveyance method executed by a sheet conveyance device that includes a sheet placing portion on which a sheet to be conveyed is placed, a guide member disposed on the sheet placing portion so as to move in a width direction that is vertical to a sheet conveyance direction, and configured to restrict, in the width direction, a position of the sheet placed on the sheet placing portion, and a processor comprising a signal obtaining portion and a notification portion operatively coupled to a display, the sheet conveyance method comprising:
a first step of, with the signal obtaining portion, obtaining an electric signal with a value that corresponds to a position of the guide member on the sheet placing portion; and
a second step of, with the notification portion, when a difference between the value of the electric signal obtained in the first step and any of one or more thresholds is equal to or smaller than a predetermined reference value, causing the display to display a notification that the sheet placed on the sheet placing portion is separated from the guide member, the one or more thresholds being set in advance based on a length in the width direction for each size of the sheet for determination of a size of the sheet, wherein
each of the one or more thresholds is set in advance to be in a range between lengths in the width direction of different sizes closest to each other.

* * * * *